United States Patent [19]

Bugler, III et al.

[11] Patent Number: 4,579,692
[45] Date of Patent: Apr. 1, 1986

[54] WATER DISTRIBUTION METHOD AND FLUME FOR WATER COOLING TOWER

[75] Inventors: Thomas W. Bugler, III, Prairie Village, Kans.; James D. Randall, Kansas City, Mo.

[73] Assignee: The Marley Cooling Tower Company, Mission, Kans.

[21] Appl. No.: 718,959

[22] Filed: Apr. 2, 1985

[51] Int. Cl.⁴ .............................................. B01F 3/04
[52] U.S. Cl. .................................. 261/111; 239/193; 239/268; 261/DIG. 11; 261/DIG. 44
[58] Field of Search ......... 261/111, 110, 97, DIG. 44; 239/193, 266, 268

[56] References Cited

U.S. PATENT DOCUMENTS

| | | | |
|---|---|---|---|
| 1,987,881 | 1/1935 | Von Seggern et al. | 261/DIG. 44 |
| 2,858,119 | 10/1958 | Wright et al. | 261/DIG. 44 |
| 3,259,380 | 7/1966 | Brown | 261/97 |
| 3,268,217 | 8/1966 | Goitein | 261/110 |
| 3,273,872 | 9/1966 | Eckert | 261/110 |
| 3,315,896 | 4/1967 | Jacir | 239/193 |
| 3,322,409 | 5/1967 | Reed | 261/111 |
| 3,875,269 | 4/1975 | Forchini et al. | 261/111 |
| 4,032,604 | 6/1977 | Parkinson et al. | 261/111 |

FOREIGN PATENT DOCUMENTS

| | | | |
|---|---|---|---|
| 941731 | 2/1974 | Canada | 261/DIG. 44 |
| 668293 | 3/1952 | United Kingdom | 261/DIG. 44 |

Primary Examiner—Tim Miles
Attorney, Agent, or Firm—Schmidt, Johnson, Hovey & Williams

[57] ABSTRACT

A mechanical draft crossflow cooling tower is provided with a novel hot water distribution structure which overlies a fill assembly. The distribution structure includes a basin which extends horizontally along the length of the fill assembly and the basin bottom is provided with a plurality of metering nozzles for directing the flow evenly across the top face of the fill assembly. Additionally, a flume is located within the confines of the basin and extends horizontally along the length of the latter in spaced disposition from the basin bottom. The flume has opposed sidewalls which are operable as weirs such that the water is evenly directed to all areas of the basin. As such, the static head on each of the nozzles is equivalent throughout the length of the basin so that the hot water is evenly directed toward all areas of the fill assembly regardless of the flow rate of the water.

16 Claims, 6 Drawing Figures

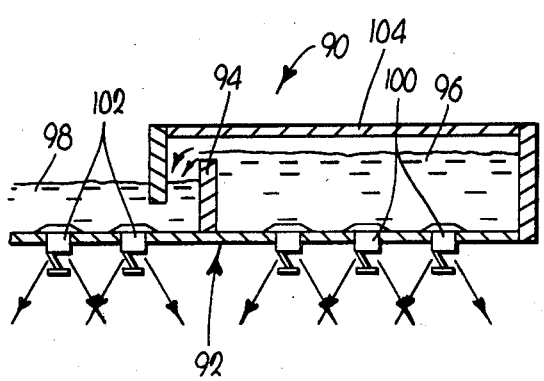
Fig. 3
Prior Art
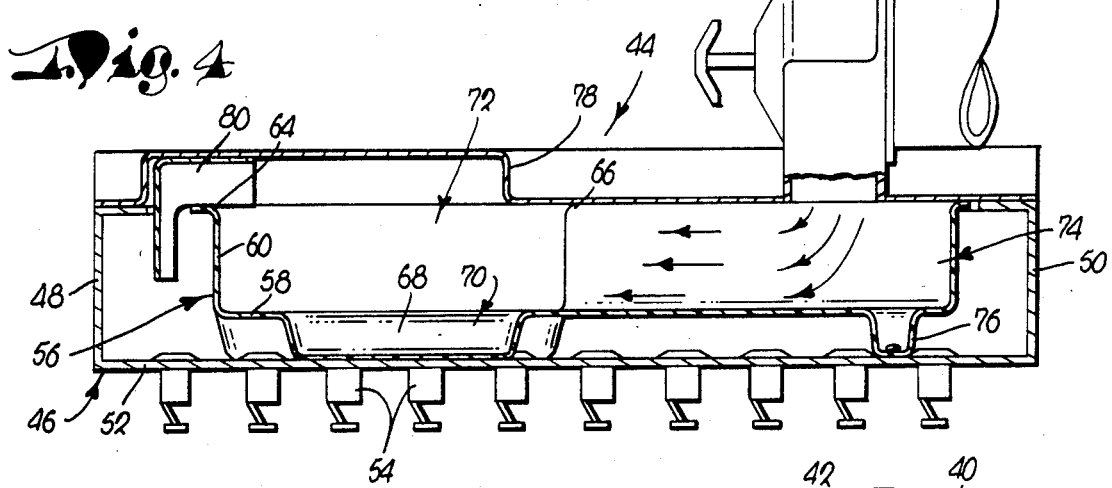
Fig. 4
Fig. 5
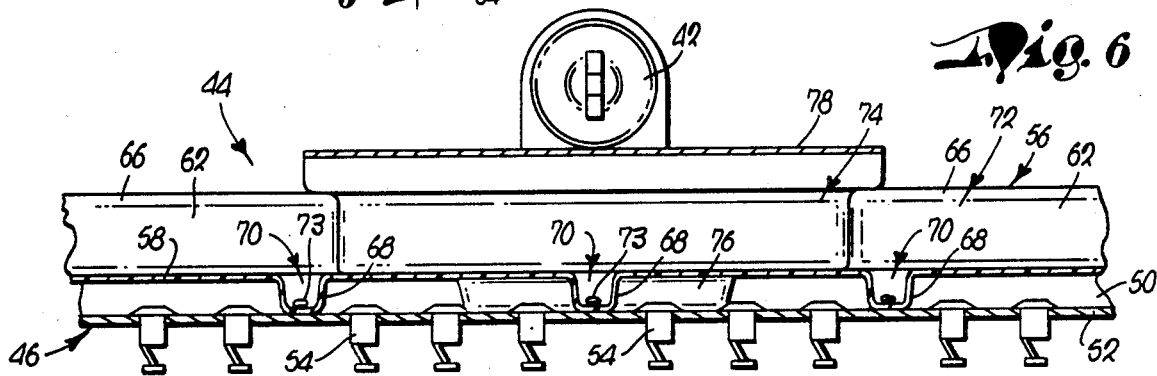
Fig. 6

WATER DISTRIBUTION METHOD AND FLUME FOR WATER COOLING TOWER

BACKGROUND OF THE INVENTION

1. Field of the Invention

This invention relates to an improved structure for continuously distributing hot water evenly across the top face of a fill assembly in a crossflow water cooling tower.

2. Description of the Prior Art

Evaporative water cooling towers conventionally include a heat-exchanging fill assembly which gravitationally receives a stream of hot water to be cooled by flow of ambient derived air therethrough. Within the fill assembly, air is brought into sensible heat exchange relationship in a manner to effect the most efficient cooling of the water possible considering factors such as overall tower cost, pumping head of the water to be cooled, the water temperature range for the particular application, geographical sites of the tower. The means for inducing air flow may comprise a natural draft, hyperbolic tower structure, but, more commonly, a motor-driven fan is utilized because the hyperbolic tower requires a large amount of space as well as capital outlay. Moreover, the fan can be selectively controlled to operate only when needed to maintain the necessary air flow through the tower in relation to the air and water temperatures, whereas the natural draft tower, in contrast, must be sized for all ambient temperatures to which the tower will be subjected.

Mechanical draft cooling towers often are arranged in partitioned cells. The fill assembly of each cell is arranged in a pair of opposed, upright banks supported by tower framework, and each cell typically has a single, horizontally-disposed fan which overlies a plenum between the banks. Hot water to be cooled is delivered through piping to a distribution basin which overlies each bank of fill assembly. Subsequently, the water exits the basin in the form of a plurality of streams or sprays gravitationally delivered from metering nozzles or discharge orifices in the basic bottom and which impinge on the upper adjacent face of the fill assembly for break up into droplets or division into films for more effective heat transfer. Finally, the cooled water is gathered in a cold water collection reservoir underlying the fill assembly for ultimate return to the point of use.

It is the functional objective of the distribution basin provided in conventional towers to receive the incoming stream of hot water and direct the same toward all of the metering nozzles such that the latter are then operable to equally discharge the water evenly over the top face of the underlying fill assembly. Water flow rates within the tower can be on the order of 1,000 to 10,000 gallons a minute or more. Depending on overall tower size, the upper face of the fill assembly may be of such horizontal dimensions that some of the metering nozzles are disposed at significant distances from the inlet pipe supplying the hot water. The flow rates of this magnitude applied to an open top distribution basin of simple, U-shaped construction results in a steady-state water depth being shallower near the pipe inlet than adjacent the ends of the basin, when it is assumed that the metering nozzles are of equivalent diameter and spaced at uniform intervals. Furthermore, the kinetic energy of the water discharging from the pipe often is of such a magnitude that very turbulent hot water basin flows are experienced, possibly resulting in loss of water due to splashing. Also, turbulent flows cause unsteady water levels in the basin such that the static head applied to each nozzle is variable, rendering the nozzle discharge flow rate uneven, if not substantially unpredictable. Furthermore, high velocity flows over the nozzles can reduce nozzle flow rates and increase uneven water distribution.

In an effort to distribute the incoming hot water to all of the metering nozzles equally, prior art cooling towers have occasionally been provided with a distribution basin having an upstanding, centrally disposed partition which, in turn, has an upper weir edge. The partition has a longitudinal axis parallel to the elongated sides of the basin, and nozzles are located in the basin bottom on both sides of the partition. In operation, the incoming hot water is directed toward one side of the weir such that the chamber bounded by the partition and an adjacent basin side operates as a flume to carry water throughout the length of the latter. As the flume fills with water, the latter overflows the weir and spills into the remaining areas of the basin. As can be appreciated, water levels in this type of flume are higher than the water levels in the remainder of the basin. Consequently, the metering nozzles in the bottom of the flume are subjected to a higher static head than the remaining nozzles in the basin and, to compensate for this head difference, nozzles within the flume are typically provided with a smaller opening than the nozzles in the remaining basin area. However, such compensation requires extensive mathematical calculations for proper nozzle sizing under ideal water flow rates. Additionally, when the tower is operating under a reduced water flow such mathematical compensation is in error, often resulting in a portion of the nozzles receiving all or a significantly larger proportion of the hot water to the exclusion of a remaining portion of the metering nozzles. Obviously, such construction substantially reduces tower efficiencies.

It has also been suggested in the past to provide a distribution structure wherein a flume is positioned externally of the basin in side-by-side relationship. However, location of such a flume on the inboard side of the fill assembly adjacent the distribution basin interferes with the air pathways through the central portion of the tower. By contrast, placement of such a side-by-side flume on the outboard side of the fill assembly adjacent the basin interrupts the clean, aesthetically pleasing lines of the tower wall. In either case, this type of flume requires an additional, extensive support structure and, by necessity, thereby increases the overall size and cost of the tower correspondingly.

SUMMARY OF THE INVENTION

The hot water supply and distribution structure of the present invention overcomes the above-noted disadvantages of the prior art by provision of a novel flume that is disposed substantially within and along the length of a distribution basin. The flume is operable to direct the incoming flow of hot water to all areas of the basin such that the static head of water is equal for each of the metering nozzles.

In more detail, the flume is an elongated, U-shaped, open topped water conduit provided with a plurality of legs which support the flume in spaced disposition from the bottom of the basin. Hot water is received within the flume in a central stilling chamber which is horizontally aligned with the flume but preferably is offset from the longitudinal axis of the same. Adjacent the stilling chamber, turbulence of the water stream is reduced significantly due to (1) a relatively sharp, 90° change in flow direction as the water descends vertically from the control valve and then horizontally enters the stilling chamber, and (2) horizontal, 90° deflection of the flow stream as the latter exits the stilling chamber and divides into equal, opposite streams for subsequent movement toward either end of the flume.

As the water travels longitudinally in the flume, the level rises therein until the water flows over a pair of weirs or sidewalls which extend horizontally along a substantial length of the flume. The weirs are operable to deliver the water into the underlying basin evenly and equally along the entire length of the latter whereby the basin water level is substantially uniform throughout. As a result, the metering nozzles which direct the water in the basin to the fill assembly are invariably subjected to equivalent static head regardless of water flow rates, whereby each of the nozzles can be provided with equal effective openings.

Advantageously, the legs of the flume are U-shaped in cross-section and molded integrally with the flume bottom so that each of the legs presents a chamber in communication with the remaining water-retaining areas of the flume. The chamber in the legs impedes the flow of water in the flume, and thus further reduces turbulence such that near laminar conditions can be approached.

Noteworthy is the fact that the distribution structure of the instant invention is disposed at substantially the same height as typical distribution basins of prior art construction. Consequently, pumping as well as piping costs are not higher than those incurred in past constructions. Furthermore, the flume is very easy to install and eliminates the necessity of engineering and building a partitioned basin having a vast number of varying sized nozzles.

BRIEF DESCRIPTION OF THE DRAWINGS

FIG. 3 is a fragmentary, cross-sectional view of a partitioned distribution basin typically utilized in prior art construction;

FIG. 4 is an enlarged side cross-sectional view of the distribution basin, flume and stilling chamber of the instant invention, showing the supply pipe and control valve therefor;

FIG. 5 is a view similar to FIG. 4, but taken along a downstream portion of the flume and basin; and FIG. 6 is a fragmentary, reduced, cross-sectional view taken along line 6—6 of FIG. 5.

DETAILED DESCRIPTION OF THE DRAWINGS

Figure 1:
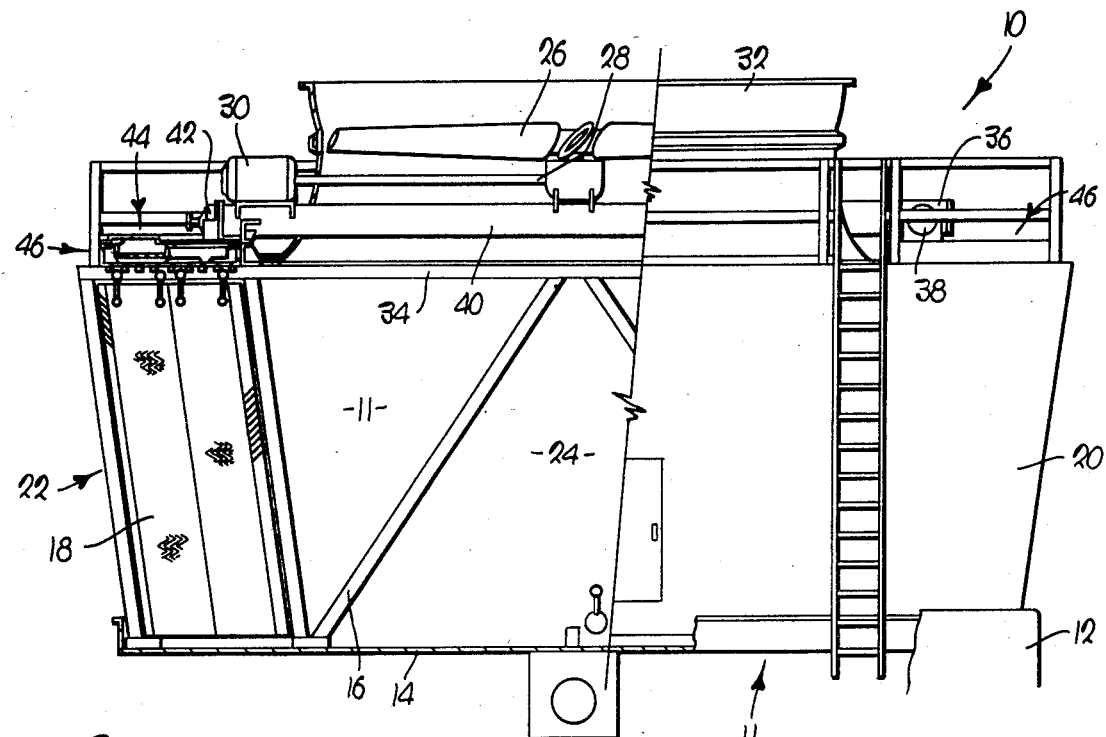
FIG. 1 is a side elevational view of a mechanical draft crossflow cooling tower embodying the present invention with the left half of the tower being in cross-section to reveal internal construction.
Figure 2:
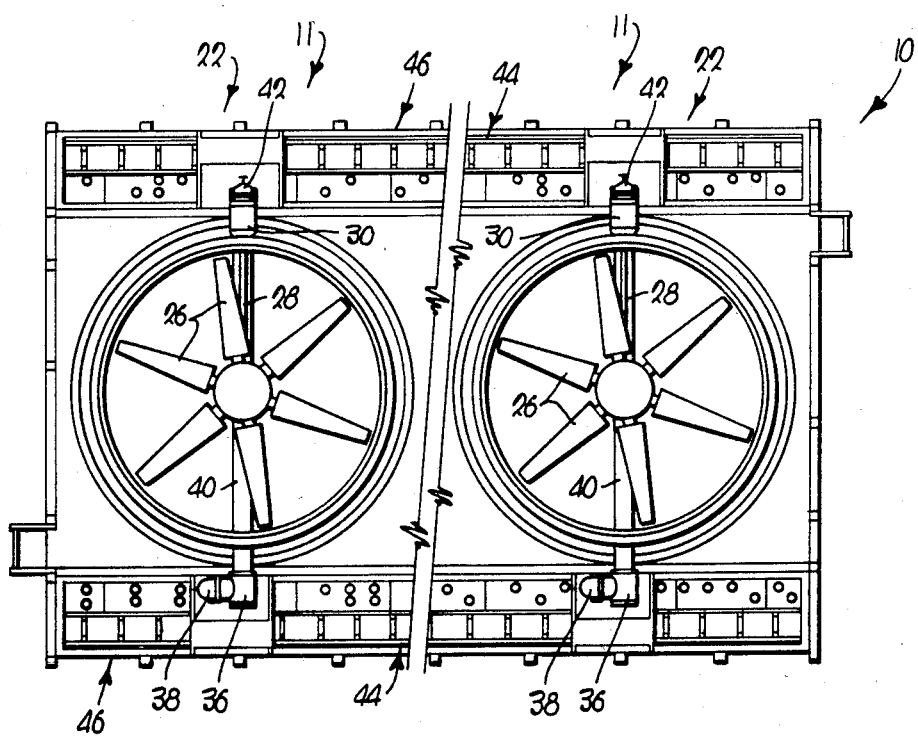
FIG. 2 is a reduced plan view of the tower illustrated in FIG. 1 and rotated 90°.

Referring now to FIGS. 1-2, a mechanical draft crossflow water cooling tower is broadly designated by the numeral 10 and conventionally is partitioned into individually operable cells 11. The tower 10 includes a foundation 12 which supports a cold water collection reservoir 14 common to or for each of the cells 11.

Internally, the tower has a framework 16 which surrounds a pair of spaced, opposed, outwardly inclined banks of fill assemblies 18 (only one being shown), while external casing 20 is secured to the framework 16 except for an area in front of each of the fill assemblies 18 that defines respective opposed air inlets 22. Within each cell 11, air is drawn through opposed fill assemblies 18 and into a plenum 24, and thence is drawn upwardly by means of a fan 26 which is powered through a shaft 28 by a motor 30. An upright, venturi-shaped cylinder 32 circumscribes the fan 26 and is positioned atop the tower 10 on a series of horizontal joists 34 of the framework 16.

Hot water is supplied to each of the cells 11 through an upstanding pipe (not shown) which is connected at its uppermost end to a tee 36, viewing FIGS. 1-2. One side of the tee 36 communicates with a control valve 38 while the opposite side of the tee 36 is connected to a horizontal pipe 40 that is, in turn, coupled at its opposite end to a control valve 42. Water discharged from the control valves 38, 42 subsequently enters distribution structures 44, 46 which horizontally direct the flow in even fashion for subsequent, uniform gravitational descent through the fill assemblies 18 and toward the collection reservoir 14.

As seen in FIG. 2, the distribution structure 44 on each side of the cell 11 is comprised of an elongated distribution basin 46 which extends horizontally over the entire top face of the fill assembly 18. Referring to FIGS. 4 and 5, the basin 46 is generally U-shaped in transverse cross-section and has a pair of spaced, parallel sides 48, 50 which are joined to a flat bottom 52. A plurality of discharge orifices or metering nozzles 54 are spaced at uniform intervals along the bottom 52 above the fill assembly 18 and each of the nozzles 54 is advantageously provided with an identical effective cross-sectional opening.

The distribution structure 44 also includes an elongated distribution flume 56 which extends horizontally the length of the tower cell 11, as illustrated best in FIG. 2. Referring to FIG. 5, it will be seen that the flume 56 overlies the basin 46 and is generally disposed within the confines of the latter. Furthermore, the longitudinal axis of the flume 56 is parallel but offset from the longitudinal axis of the basin 46.

The flume 56 includes a bottom panel 58 which interconnects a pair of spaced, opposed, upright walls 60, 62. Both of the walls 60, 62 terminate at their uppermost portions in opposed, outwardly curved edges or weirs 64, 66 respectively.

Referring now to FIG. 6, the flume 56 is advantageously molded of a glass fiber reinforced synthetic resin material such as polyester with the bottom panel 58 being provided with a plurality of spaced, integral, elongated legs 68 that support the flume 56 in spaced disposition above the bottom 52 of the basin 46. The longitudinal axis of each of the legs 68 is perpendicular to the longitudinal axis of the flume 56. Each of the legs 68 is also generally U-shaped in transverse, cross-sectional configuration such that an elongated cavity 70 is defined therein which is in communication with a flume channel 72, the latter of which is bounded generally by the sidewalls 60, 62 and the portions of the panel 58 which are between the legs 68. Furthermore, a pair of holes 73 are disposed in a lowermost portion of each of the legs 68 in order to drain standing water in the flume 56 whenever operation of the tower 10 is halted.

Each flume channel 72 communicates with a laterally adjacent stilling chamber 74 which is positioned below the outlet of a respective control valve 38 or 42. As shown in FIG. 4, the stilling chamber 74 has a leg 76 that is generally similar in shape to each of the legs 68.

A cover 78, as shown in FIGS. 4-6, is located over the stilling chamber 74 to confine water emerging from control valve 42. The cover 78 also extends over a central area of the flume 56 adjacent the chamber 74, but is elevated somewhat in this area to provide an escape for water overflowing a proximal portion of the weir 64. A shield or deflector 80 depends vertically from the elevated portion of the cover 78 to control splashing of water exiting from the stilling chamber 74.

By way of comparison, FIG. 3 depicts a typical prior art distribution structure 90 which includes a basin 92 that is divided by an upstanding partition or weir 94 which defines a flume 96 and an adjacent outer basin or aqueduct 98. Both the flume 96 and the aqueduct 98 extend the entire length of the elongated basin 92 in disposition overlying a fill assembly (not shown). A plurality of spaced-apart nozzles 100 are located in a bottom portion of the flume 96, while a quantity of nozzles 102 are provided in a lower portion of the aqueduct 98. Additionally, a cover 104 extends across the flume 96 to retard excess splashing.

OPERATION

In use, a continuous stream of hot water to be cooled flows out of the control valves 38, 42, both of the latter of which are usually, but not necessarily adjusted to maintain equivalent water flow rates to each tower cell 11. As depicted by the arrows in FIG. 4, water exiting from the valve 42 descends into the stilling chamber 74 and subsequently enters the flume 56 whereupon the flow divides and substantially equal quantities of the water are sent in opposite directions along the length of the flume channel 72.

After initial startup, the water fills the flume 56, then continually overflows above the weirs 64, 66 and spills into the basin 46. The horizontal nature and equivalent height of the weirs 64, 66 insures that the hot water will flow equally into the basin 46 along the entire length of the latter. Optionally, the sidewalls 60, 62 may be provided with vertically adjustable weir plates for the purpose of water management under reduced flow rate conditions.

As depicted in FIG. 5, the water static head over each of the nozzles 54 will be equivalent, including those nozzles that are disposed beneath the lower panel 58. As such, all of the nozzles 54 throughout the basin 46 may be provided with equivalent effective openings.

In the prior art distribution structure 90 as shown in FIG. 3, the flume 96 occupies a portion of the basin 92 and simultaneously directs water over the weir 94 while discharging water through the nozzles 100. Thus, the prior art basin 92 is hydraulically complex and to a degree unpredictable since the nozzles 100 in the flume 96 must be of an appropriate size so as to pass a certain percentage of the water to the underlying fill assembly as well as develop a high enough head over the weir 94 to convey a complementary percentage of water into the adjacent aqueduct 98. As such, the nozzles 100 by necessity must be provided with smaller openings than the nozzles 102. Unfortunately, engineering calculations to determine the openings of the nozzles 100, 102 must be based on a specified flow rate and, as a result, the distribution structure 90 can not direct water evenly to the underlying fill assembly when variable water flow rates are encountered, or such rates are above or below the rate for which the nozzles were especially sized.

The flume 56 of the instant invention, in cooperation with the stilling chamber 74, is also operable to greatly dissipate the kinetic energy of the incoming water from the control valve 42. As seen in FIG. 4, the water exiting the valve 42 is confined by the cover 78 within the stilling chamber 74 while experiencing a sharp 90° angular deflection. Immediately downstream, the water enters the T-shaped intersection of the flume 56 with the stilling chamber 74, whereupon one-half of the flow is horizontally directed at a 90° angle toward the left while the remaining portion of the water is deflected 90° horizontally to the right. Furthermore, the cavity 70 in each of the legs 68 is operable to also reduce turbulence in the flowing stream, whereby water in the flume approaches laminar conditions. Consequently, water exiting the flume 56 over the weirs 64, 66 will be distributed evenly along the basin 46 by virtue of the fact that splashing and wave motion has been largely eliminated.

Also noteworthy is the fact that utilization of the flume 56 within the basin 46 offers flexibility of design as well as construction. Specifically, the flume 56 having specified dimensions may be utilized in a basin 46 of any width and may be easily retrofitted into existing towers. The flume 56 requires no expensive or extensive support structure and does not occupy valuable space within the plenum 24. Additionally, the provision of a stilling chamber 74 disposed laterally of the flume 56 enables identical distribution structure 44 to be utilized on both sides of the tower, regardless of the fact that the control valve 38 is, be necessity, positioned in a different orientation than the control valve 42, as will be evident by reference to FIG. 2.

We claim:

1. In combination with a crossflow water cooling tower provided with a fill assembly, a hot water distribution structure comprising:

an elongated, horizontally-extending distribution basin overlying said fill assembly, said basin being provided with a bottom having a plurality of spaced orifices therein, each of said orifices being operable to discharge water within said basin to said fill assembly;

an elongated distribution flume adapted to receive a flow of hot water to be cooled at any one of a number of different flow rates;

said flume having weir means extending horizontally substantially along the length of the flume, said flume being disposed within the confines of said basin such that the longitudinal axis of the latter is generally parallel to the longitudinal axis of said flume, and the flume being supported in substantially spaced disposition from said bottom of said basin, whereby said weir means of said flume is operable to discharge overflowing hot water evenly throughout all areas of said basin such that the static head of water within the basin is substantially equivalent for each of said nozzles regardless of the water flow rate.

2. A distribution structure as set forth in claim 1, wherein said flume is supported by a plurality of feet disposed for engagement with a portion of said basin bottom.

3. A distribution structure as set forth in claim 2, said feet being constructed with an internal cavity wherein each of said cavities are operable to communicate with water flowing within the flume to reduce turbulence of said water.

4. A distribution structure as set forth in claim 1, wherein said flume is coupled to a stilling chamber laterally offset from said flume and in communication with the water-receiving areas of the latter, said stilling chamber being operable to receive a discharge of water from an inlet in a direction to decrease the kinetic energy of said flowing water.

5. The invention of claim 4; and a cover overlying said stilling chamber to preclude splashing of water.

6. The invention of claim 1, said flume having a generally U-shaped, transverse cross-sectional configuration.

7. In a method of relatively uniformly dissipating the kinetic energy of a confined flow of hot water which is subsequently dispersed and thereafter distributed over an upper face of a cooling tower fill assembly, the steps of:

directing the flow of water along a first path in a downward direction;

next advancing said water along a second path of travel at a substantial angle relative to said first path as the descending water is redirected substantially horizontally in a stilling chamber; and allowing said water to flow along a third path of travel which is at a substantial angle with respect to the second path thereof as said water moving horizontally to said stilling chamber is advanced laterally in an elongated, generally horizontal flume for subsequent distribution to an apertured basin overlying said upper face of said fill assembly.

8. The method of claim 7, wherein is included the step of causing said flow of water from said second path to diverge into two separate third path flow streams, each of said divergent flow streams being at a substantial angle with respect to said second path of travel and directed by respective flume structures for subsequent distribution to corresponding apertured basins overlying the upper faces of respective fill assemblies.

9. The method of claim 8, wherein said diverging flow streams are of substantially equal flow rates and paths of approximately equal length, said diverging flow paths being disposed at substantially 90° to said second path of travel.

10. The method of claim 7, wherein said second path of travel is disposed at substantially 90° to said first path of travel.

11. The method of claim 10, wherein said third path of travel is disposed at substantially 90° to said second path of travel.

12. The method of claim 7, wherein said third path of travel is disposed at substantially 90° to said second path of travel.

13. The method of claim 7, wherein is included the step of causing the velocity of said water flow within said stilling chamber to be smaller than the velocity of entering water flow.

14. In a method of relatively uniformly dissipating the kinetic energy of a confined flow of hot water which is subsequently dispersed and thereafter distributed over an upper face of a cooling tower fill assembly, the steps of:

directing the flow of water through a horizontal supply pipe presenting a first path of travel;

thereafter causing said water to move through a control valve coupled to said horizontal supply pipe in disposition such that the water exits said valve along a second path in a downward direction;

next advancing said water along third path of travel at a substantial angle relative to said second path as the descending water exiting said control valve is redirected substantially horizontally in a stilling chamber; and allowing said water to flow along a fourth path of travel which is at a substantial angle with respect to the third path thereof as said water moving horizontally in said stilling chamber is advanced laterally in an elongated, generally horizontal flume for subsequently distribution to an apertured basin overlying said upper face of said fill assembly.

15. The method of claim 14, wherein said third path of travel is disposed at substantially 90° to said second path of travel.

16. The method of claim 14, wherein the velocity of said water flow within said stilling chamber is smaller than the velocity of water flow within said supply pipe.

* * * * *